United States Patent
Adcock et al.

(10) Patent No.: US 10,505,208 B2
(45) Date of Patent: Dec. 10, 2019

(54) WATER RECOVERY IN A FUEL CELL SYSTEM

(71) Applicant: Intelligent Energy Limited, Loughborough (GB)

(72) Inventors: Paul Leonard Adcock, Loughborough (GB); Benjamin Burslem, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 213 days.

(21) Appl. No.: 15/120,729

(22) PCT Filed: Feb. 18, 2015

(86) PCT No.: PCT/GB2015/050469
§ 371 (c)(1),
(2) Date: Aug. 22, 2016

(87) PCT Pub. No.: WO2015/124925
PCT Pub. Date: Aug. 27, 2015

(65) Prior Publication Data
US 2016/0359180 A1 Dec. 8, 2016

(30) Foreign Application Priority Data
Feb. 24, 2014 (GB) .................................. 1403205.6

(51) Int. Cl.
*H01M 8/04007* (2016.01)
*H01M 8/04111* (2016.01)
*H01M 8/04119* (2016.01)

(52) U.S. Cl.
CPC ... *H01M 8/04164* (2013.01); *H01M 8/04067* (2013.01); *H01M 8/04111* (2013.01)

(58) Field of Classification Search
None
See application file for complete search history.

(56) References Cited

U.S. PATENT DOCUMENTS 6,171,718 B1 * 1/2001 Murach ............ H01M 8/04029
425/25
6,363,731 B1 4/2002 Konrad et al.
(Continued)

FOREIGN PATENT DOCUMENTS

DE 19961057 6/2000
DE 19943059 3/2001
(Continued)

OTHER PUBLICATIONS

DE 10124502—Machine translation (Year: 2002).*
(Continued)

*Primary Examiner* — Haroon S. Sheikh
(74) *Attorney, Agent, or Firm* — BakerHostetler

(57) ABSTRACT

A fuel cell system comprises a fuel cell stack with a cathode exhaust outlet coupled to a cathode exhaust conduit. A condenser is provided in the cathode exhaust conduit for extracting water from a cathode exhaust stream in the cathode exhaust conduit. A compressor is disposed in the cathode exhaust conduit between the cathode exhaust outlet and the condenser and an expander is disposed downstream of the condenser for recovering energy from the condenser exhaust stream. By providing compressor and expander stages on either side of the condenser, the condenser performance can be enhanced by higher pressure operation independent of the fuel cell pressure. The parasitic load of this pressurised operation of the condenser is reduced by recovering the energy from the exhaust stream.

9 Claims, 6 Drawing Sheets

(56) References Cited

U.S. PATENT DOCUMENTS

| | | | |
|---|---|---|---|
| 6,379,829 B1 | 4/2002 | Kurita | |
| 2003/0190503 A1* | 10/2003 | Kumar | C01B 3/48 423/651 |
| 2003/0190513 A1* | 10/2003 | Meissner | F28D 9/0062 429/413 |
| 2005/0142398 A1 | 6/2005 | Browall et al. | |
| 2006/0134471 A1 | 6/2006 | Gerard | |
| 2014/0227618 A1 | 8/2014 | Handgraetinger et al. | |

FOREIGN PATENT DOCUMENTS

| | | |
|---|---|---|
| DE | 10124502 | 11/2002 |
| DE | 102011111742 | 2/2013 |
| FR | 2860646 | 4/2005 |
| FR | 2864351 | 6/2005 |
| FR | 2870641 | 11/2005 |
| FR | 2874911 | 3/2006 |
| FR | 2883667 A1 | 9/2006 |
| WO | 200039874 | 7/2000 |

OTHER PUBLICATIONS

FR2860646—Machine translation (Year: 2005).*
International Search Report and Written Opinion dated Aug. 27, 2015, in International Application No. PCT/GB2015/050469.
Great Britain Patent Application No. 1403205.6; Search Report; dated Dec. 4, 2015; 5 pages.
International Patent Application No. PCT/GB2015/050469; Int'l Preliminary Report on Patentability; dated Aug. 30, 2016; 16 pages.

* cited by examiner

WATER RECOVERY IN A FUEL CELL SYSTEM

CROSS-REFERENCE TO RELATED APPLICATIONS

This patent application is a U.S. National Stage Patent Application of International Patent Application PCT/GB2015/050469 filed Feb. 18, 2015, which claims priority to Great Britain Patent Application GB 1403205.6 filed Feb. 24, 2014, the disclosures of which are incorporated by reference in their entirety.

The present invention relates to water recovery in fuel cell systems, and in particular to improving water recovery processes and heat transfer. The present invention also relates to energy recovery in such fuel cell systems.

Electrochemical fuel cells convert fuel and oxidant, generally both in the form of gaseous streams, into electrical energy and a reaction product. A common type of electrochemical fuel cell for reacting hydrogen and oxygen comprises a polymeric ion transfer membrane, also known as a proton exchange membrane (PEM), within a membrane-electrode assembly (MEA), with fuel and air being passed over respective sides of the membrane. Protons (i.e. hydrogen ions) are conducted through the membrane, balanced by electrons conducted through a circuit connecting the anode and cathode of the fuel cell. To increase the available voltage, a stack is formed comprising a number of MEAS electrically arranged in series. Each MEA is provided with separate anode and cathode fluid flow paths. The anode and cathode fluid flow paths respectively deliver fuel and oxidant to the membrane. The fuel cell stack is typically in the form of a block comprising numerous individual fuel cell plates held together by end plates at either end of the stack.

Because the reaction of fuel and oxidant generates heat as well as electrical power, a fuel cell stack requires cooling once an operating temperature has been reached, to avoid damage to the fuel cells. Evaporatively-cooled fuel cell systems use the phase change of water to vapour to provide fuel cell stack cooling. Water is injected into the cathode air stream in the fuel cell stack and sufficient water is evaporated in the stack that the thermal energy generated by the losses in the fuel-oxidant reaction and electrical losses are balanced by the change in enthalpy of the water, mainly due to its phase change.

Liquid water is condensed from the cathode exhaust stream by a condenser to recover sufficient water to inject into the stack. The evaporation rate and water condensation rate do not need to be equal at any particular time but on average at least as much water should be condensed as evaporated. Differences in flows can be buffered by an amount of liquid in a water tank. Thus the condensing water recovery system can be decoupled from the stack evaporation process. In some systems make-up water may be added to the system.

The temperature at which the fuel cell stack operates is dependent on several parameters. One of these is the pressure of the cathode air. The higher the pressure, the hotter the stack will operate. Typically at 1 bar(a) pressure, a typical PEM fuel cell stack operates between about 70 and 85 degrees C. To condense sufficient water on average, the condenser exit stream needs to be between 55 and 65 degrees C. at 1 bar(a).

Under certain circumstances, it can be desirable to limit the temperature and/or pressure of operation of the fuel cell stack to avoid damage to the materials within the stack, such as the PEM. However, it can be advantageous to enable operation of the condenser, downstream of the stack, at a different temperature and/or pressure to the fuel cell stack in order to optimise the rate of water recovery. For example, under certain conditions it may be advantageous to operate the condenser at an elevated pressure, i.e. higher than the pressure of the fuel cell stack cathode exhaust. This requires additional energy to be input into the cathode exhaust stream passing through the condenser.

It is an object of the present invention to provide methods and apparatus for managing operation of a condenser under conditions of different temperature and/or pressure than the cathode exhaust stream from the fuel cell stack. It is another object of the invention to manage energy flows into and out of the condenser to improve performance of the fuel cell system, e.g. by reducing parasitic losses on the fuel cell system. One or more of these objects may be achieved with selected embodiments described hereinafter.

According to one aspect, the present invention provides a fuel cell system comprising:
  a fuel cell stack having a cathode exhaust outlet coupled to a cathode exhaust conduit;
  a condenser in the cathode exhaust conduit for extracting water from a cathode exhaust stream in the cathode exhaust conduit;
  a first compressor disposed in the cathode exhaust conduit between the cathode exhaust outlet and the condenser;
  an expander disposed downstream of the condenser for recovering energy from the condenser exhaust stream.

The first compressor and the expander may be coupled to pass energy recovered by the expander from the condenser exhaust to the first compressor. The first compressor and the expander may be mechanically coupled to pass said recovered energy. The fuel cell system may include a motor coupled to drive the first compressor and the expander. The fuel cell system may include a first water separator disposed between the cathode exhaust outlet and the first compressor. The fuel cell system may include a second water separator disposed between the condenser and the expander. The fuel cell system may include a water storage vessel disposed between an outlet of the condenser and a cathode inlet of the fuel cell stack. The fuel cell system may include a second compressor coupled to a cathode inlet of the fuel cell stack. The second compressor and the expander may be coupled to pass energy extracted by the expander from the condenser exhaust to the second compressor. The fuel cell system may include a motor coupled to drive the first compressor. The fuel cell system may include a controller configured to vary the power supplied to the first compressor as a function of volume of water in a water recirculation circuit.

According to another aspect, the present invention provides a fuel cell system comprising:
  a fuel cell stack having a cathode exhaust outlet coupled to a cathode exhaust conduit;
  a first condenser in the cathode exhaust conduit for extracting water from a cathode exhaust stream in the cathode exhaust conduit;
  a refrigeration circuit coupled to the condenser to extract heat from the first condenser.

The fuel cell system may comprise a second, higher temperature, condenser in the refrigeration circuit configured to receive heat extracted from the first condenser. The fuel cell system may include an expander disposed downstream of the first condenser for extracting energy from the first condenser exhaust stream. The fuel cell system may include a compressor coupled to a cathode fluid inlet of the fuel cell stack, in which the compressor and the expander are coupled to pass energy extracted by the expander from the first condenser exhaust stream to the compressor. The compressor and the expander may be mechanically coupled to pass said extracted energy. The fuel cell system may include a motor coupled to drive the compressor and the expander.

According to another aspect, the present invention provides a fuel cell system comprising:
  a fuel cell stack having a cathode exhaust outlet coupled to a cathode exhaust conduit;
  a condenser in the cathode exhaust conduit for extracting water from a cathode exhaust stream in the cathode exhaust conduit;
  a refrigeration circuit including an evaporator unit in the cathode exhaust conduit, downstream of the condenser, to extract heat from the cathode exhaust stream in the cathode exhaust conduit.

According to another aspect, the present invention provides a fuel cell system comprising:
  a fuel cell stack having a cathode fluid inlet and a cathode exhaust outlet, the cathode exhaust outlet being coupled to a cathode exhaust conduit;
  a first compressor coupled to the cathode fluid inlet for supplying cathode fluid to the cathode of the fuel cell stack;
  a condenser in the cathode exhaust conduit for extracting water from a cathode exhaust stream in the cathode exhaust conduit;
  an expander disposed downstream of the condenser for extracting energy from the condenser exhaust stream, the first compressor and the expander being coupled to pass energy recovered by the expander from the condenser exhaust to the first compressor.

The first compressor and the expander may be mechanically coupled to pass said recovered energy. The fuel cell system may include a motor coupled to drive the first compressor and the expander. The fuel cell system may include a second compressor, in series with the first compressor, to supply cathode fluid to the cathode of the fuel cell stack, the first and second compressors being separately controllable. The second compressor may be motor-driven.

The fuel cell system may include a fuel generator, and a heat conduit configured to transfer heat dissipated in the condenser to the fuel generator. The fuel cell system may be incorporated within a combined heat and power system, the system including a heat output element coupled to the condenser.

Embodiments of the present invention will now be described by way of example and with reference to the accompanying drawings in which.

Figure 1:
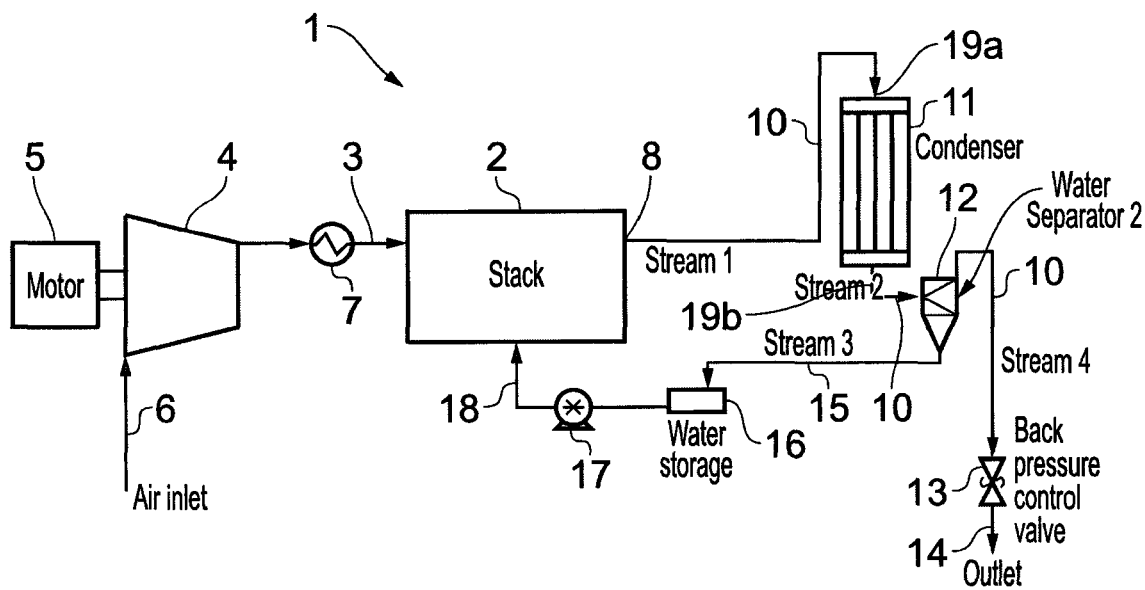
FIG. 1 shows a schematic diagram of a fuel cell system incorporating a fuel cell stack with inlet air flow compression, outlet condenser and back pressure control.

FIG. 1 shows a basic fuel cell system 1 having a fuel cell stack 2 with an anode fluid flow channel and a cathode fluid flow channel extending through cells in the stack as is well known in the art. A cathode fluid inlet 3 provides cathode fluid (e.g. oxidant air) to the cathode fluid flow channels in the stack 2. The cathode fluid inlet 3 is supplied by a compressor 4 driven by a motor 5. The inlet 6 to the compressor 4 may be supplied with ambient air.

The compressor 4 may be any suitable device for force-ventilation of the cathode fluid flow channel through the stack. An intercooler 7 may be included to reduce the temperature of the cathode inlet air and is disposed between the compressor 4 outlet and the cathode fluid inlet 3. The fuel cell stack 2 has a cathode exhaust outlet 8 which is coupled to a cathode exhaust conduit 10. In the cathode exhaust conduit 10 is a condenser 11, a water separator 12 and a back pressure control valve 13 leading to an outlet or vent 14. The condenser 11 has an inlet 19a and an exhaust or outlet 19b. The water separator 12 has a liquid outlet port 15 coupled to a water storage vessel 16 which serves as a reservoir. The water storage vessel is coupled to an injection mechanism 17 such as a pump which is used to inject water, via water line 18, into the cathode fluid flow channel in the fuel cell stack 2. The water injection may be direct water injection, e.g. injection of the water directly into cathode flow channels in the stack, or by injection into the cathode fluid inlet 3, e.g. by humidification of the air flows from compressor 4. The water separator 12, liquid outlet port 15, water storage vessel 16, injection mechanism 17 and water line exemplify a water recirculation circuit.

Figure 2:
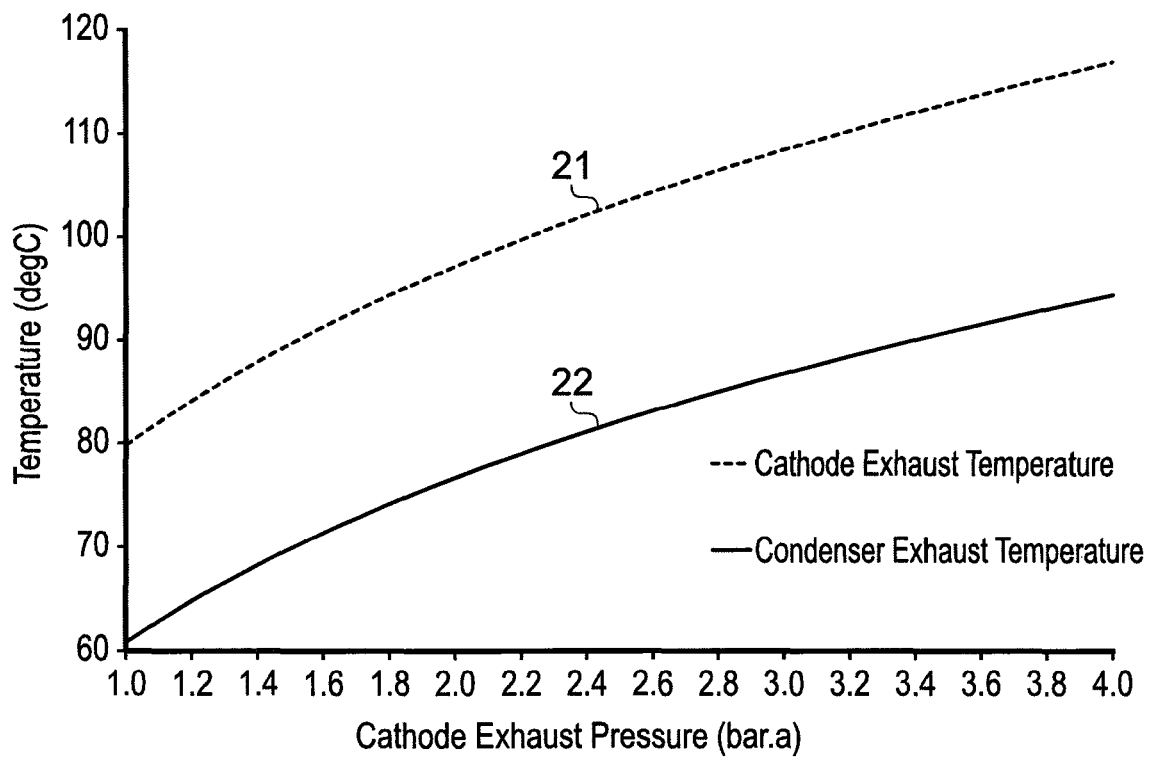
FIG. 2 is a graph showing the relationship that stack temperature and condenser temperature have with cathode exhaust pressure.

FIG. 2 shows the influence of pressure on the temperature of the fuel cell stack 2 and the temperature of the condenser 11 at the condenser outlet 19b. Curve 21 illustrates the temperature at the cathode exhaust outlet 8 as a function of cathode exhaust pressure and curve 22 illustrates the temperature of the condenser 11 outlet 19b as a function of cathode exhaust pressure. When the stack 2 is lightly loaded and the ambient temperature at compressor inlet 6 is cool, the system 1 can operate at low pressure. However, at high ambient temperature and/or high loads (e.g. high electrical load on the stack) the pressure within the stack 2 can be increased, e.g. by increasing the speed of compressor 4 and/or by regulating the back pressure valve 13. Consequently the temperature of the stack 2 and the condenser 11 will increase in line with the curves shown in FIG. 2.

Figure 3:
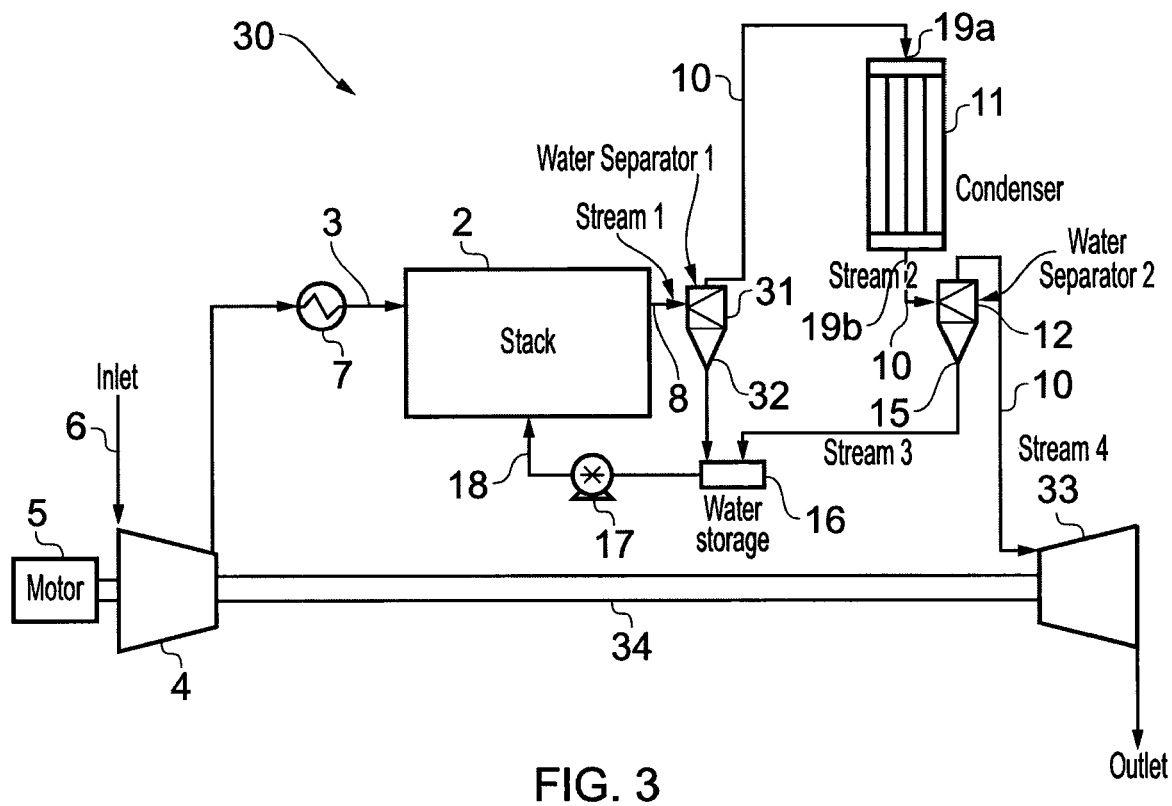
FIG. 3 shows a schematic diagram of a fuel cell system incorporating a fuel cell stack with inlet air flow compression, outlet condenser and condenser outlet expander.

FIG. 3 shows a modification to the fuel cell system of FIG. 1. Where features in the system of FIG. 3 correspond to those in the system of FIG. 1, the same reference numerals have been used and the discussion of those features is not repeated. In FIG. 3, an important difference in the fuel cell system 30 is in the replacement of the backpressure control valve 13 with an expander 33. The expander 33 may be an expansion turbine or turbo-expander, such as a centrifugal or axial flow turbine through which high pressure gas from the condenser 11 exhaust 19b is expanded to extract energy from the gas flow, in the cathode exhaust conduit 10. The energy extracted/recovered from the condenser exhaust is used to assist in driving the stack compressor 4, e.g. by way of mechanical link 34 or via an electrical generator on the expander 33. Also shown in FIG. 3 is an additional water separator 31 having a liquid outlet port 32 coupled to the water storage vessel 16, for recirculating recovered water. The water separators 12 and 31, liquid outlet port 15 and 32, water storage vessel 16, injection mechanism 17 and water line 18, exemplify a water recirculation circuit. The arrangement of FIG. 3 provides for a degree of energy recovery from the condenser exhaust stream which can be returned to the stack compressor.

Figure 4:
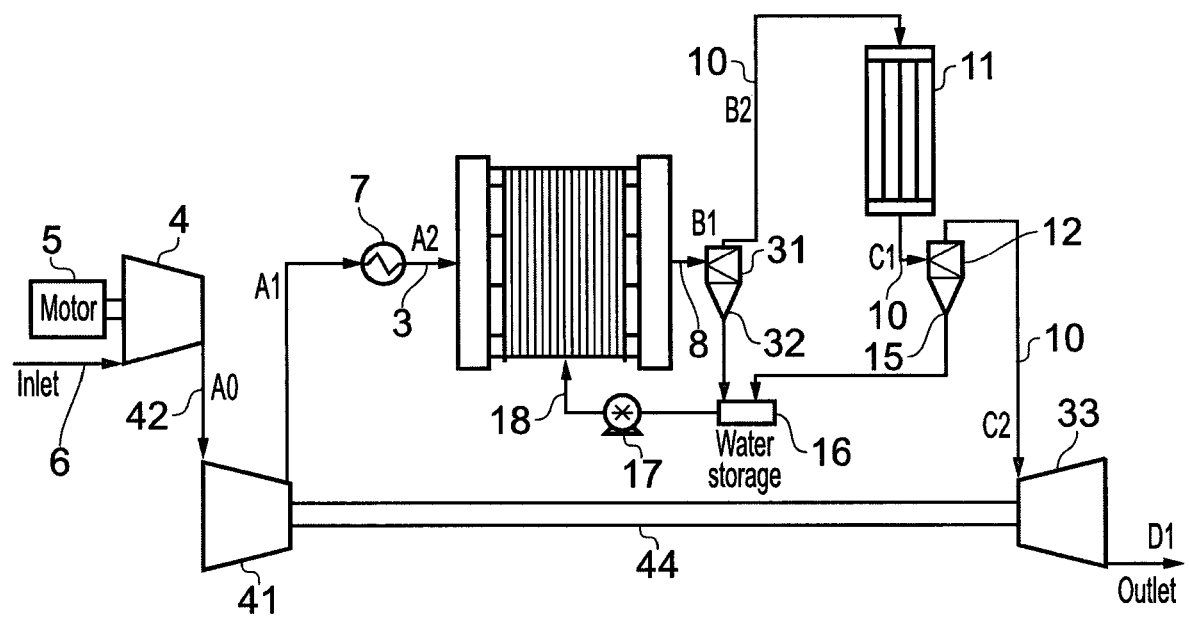
FIG. 4 shows a schematic diagram of a fuel cell system incorporating a fuel cell stack with inlet air flow compression, outlet condenser and condenser outlet expander.

FIG. 4 shows another example of a fuel cell system 40 similar to that of FIG. 3. Where features in the system of FIG. 4 correspond to those in the systems of FIG. 1 or FIG. 3, the same reference numerals have been used and the discussion of those features is not repeated. An important difference between the fuel cell system 40 of FIG. 4 and the fuel cell system 30 of FIG. 3 is that the energy recovered from expander 33 is transferred to a second stage fuel cell inlet compressor 41 rather than directly to the motor-driven inlet compressor 4. In this way, greater flexibility in control of the cathode fluid inlet pressure 3 may be effected by control of the motor 5 to supplement the energy recovered from expander 33 via mechanical link 44 to the second stage fuel cell inlet compressor 41. In this arrangement, the compressor 4 may be a lower power stage, such as a blower. The output flow of the first stage compressor 4 is fed via line 42 to the input of the second stage compressor 41.

Figure 5:
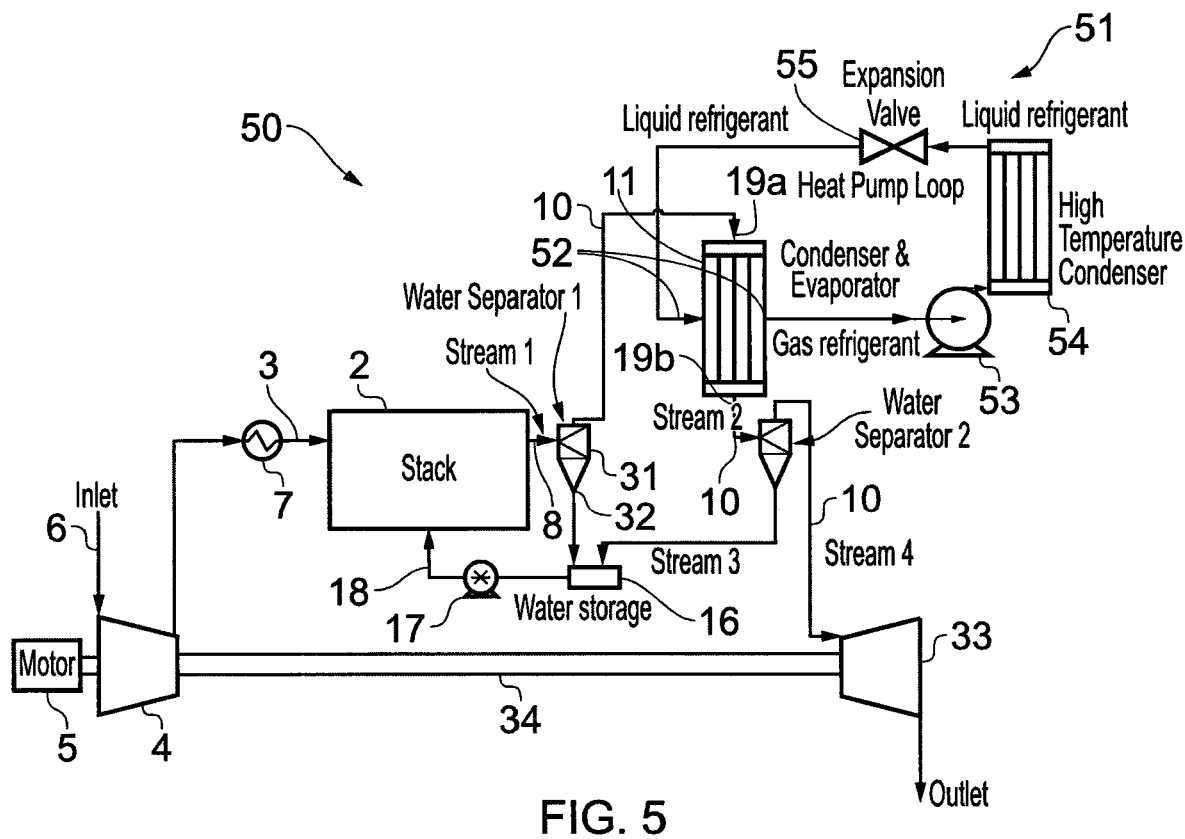
FIG. 5 shows a schematic diagram of a fuel cell system incorporating a fuel cell stack with inlet air flow compression, outlet condenser, refrigerant cooling circuit and condenser outlet expander.

FIG. 5 shows another example of a fuel cell system 50 similar to that of FIG. 3. Where features in the system of FIG. 5 correspond to those in the systems of FIG. 1, 2 or 3, the same reference numerals have been used and the discussion of those features is not repeated. An important difference between the fuel cell system 50 of FIG. 5 and the fuel cell system 30 of FIG. 3 is the addition of a refrigeration circuit 51 configured for providing an independent cooling circuit to the condenser 11. The refrigeration circuit 51 includes a cooling path 52 through the condenser 11 (e.g. a cooling jacket), a refrigeration pump/compressor 53, a high temperature condenser 54, and an expansion valve 55. This refrigeration circuit allows the high temperature condenser 54 to operate at a higher temperature than the main condenser/evaporator 11 thus improving the ability for the system to reject heat in high ambient temperature conditions.

In effect, the refrigeration circuit 51 allows the condenser 11 to operate at a lower temperature notwithstanding elevated temperatures of cathode exhaust stream in the cathode exhaust conduit 10 from the cathode exhaust outlet 8.

In an alternative arrangement, it may be appropriate that the condenser 11 first dissipates heat directly to the environment and then the refrigeration circuit condenses the condenser exhaust stream 19b to a lower temperature thus reducing the duty of the refrigeration circuit. In such an arrangement, the refrigeration circuit would include an evaporator unit in the cathode exhaust conduit 10, downstream of the condenser, to extract heat from the cathode exhaust stream in the cathode exhaust conduit.

Figure 6:
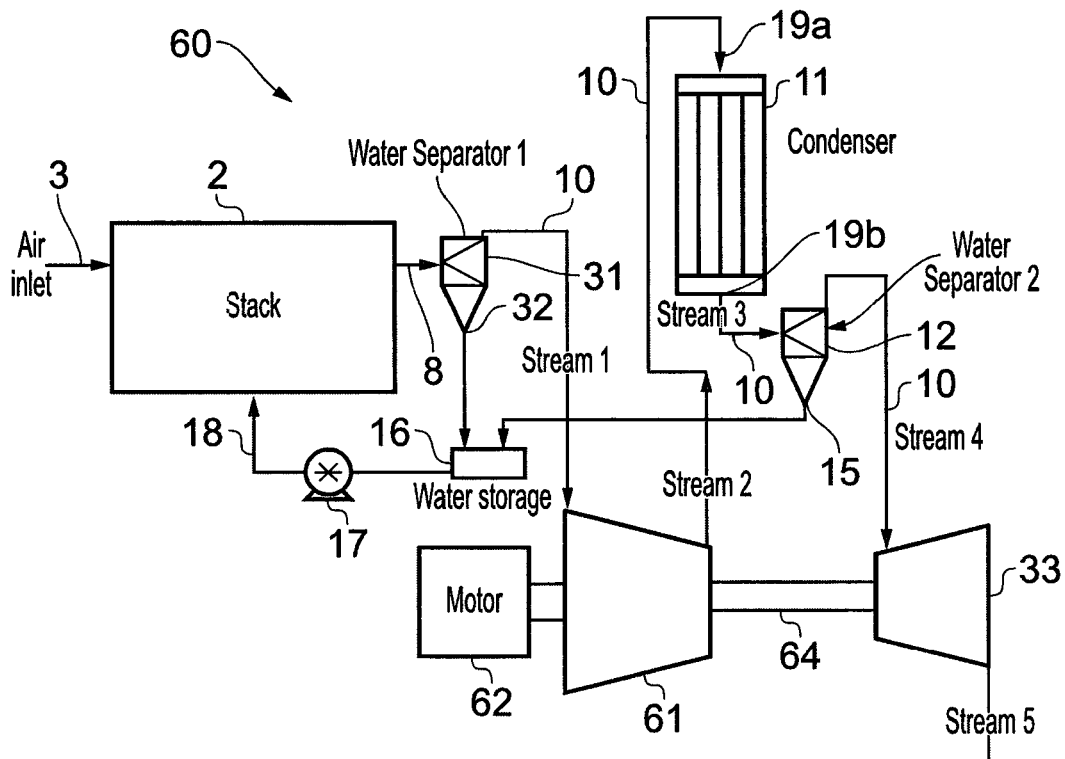
FIG. 6 shows a schematic diagram of a fuel cell system incorporating a fuel cell stack with a cathode exhaust condenser with motor-driven compression and expansion stages.

FIG. 6 shows another example of a fuel cell system 60 which is a development from that of FIG. 3. Where features in the system of FIG. 6 correspond to those in the systems of FIG. 1 or FIG. 3, the same reference numerals have been used and the discussion of those features is not repeated. An important difference between the fuel cell system 60 of FIG. 6 and the fuel cell system 30 of FIG. 3 is the positioning of a compressor 61 in the cathode exhaust conduit 10 between the cathode exhaust outlet 8 and the condenser 11. In the example shown in FIG. 6, the compressor 61 is downstream of a water separator 31.

A particular advantage of this arrangement of fuel cell system 60 is that the fuel cell stack 2 can operate at lower, e.g. near-ambient pressure and therefore operate at lower temperature while the condenser 11 can operate at high pressure. This enhances the ability to condense out water from the cathode exhaust stream, by operating the condenser at high pressure. Condenser performance varies as a function of the temperature of air flow through the condenser, i.e. the water extraction capability reduces at higher ambient temperatures. One way to mitigate this is to operate the condenser at higher pressure resulting in a higher condenser exit temperature requirement for water balance. However, it may be less desirable to operate the fuel cell above a certain pressure and temperature. High pressure operation of a fuel cell stack can result in higher temperatures and possible risk of damage to the fuel cell membrane if the temperature is above a certain value.

The arrangement of FIG. 6 recognises that the benefits of high pressure operation of the condenser can be isolated from the fuel cell stack by raising the pressure locally to the condenser. In other words, the cathode exhaust gas is compressed and expanded around the condenser 11 such that the temperature of the condenser inlet 19a can be significantly higher than at the fuel cell stack 2 cathode exhaust 8. This requires input of power, e.g. by motor 62 driving the compressor 61, which in most circumstances would be an additional parasitic load on the fuel cell stack 2. However, in the arrangement of FIG. 6, it has been recognised that this additional parasitic load can be mitigated to a significant extent by recovering a substantial portion of the energy with the expander 33. The energy recovery may be by transfer directly from the expander 33 to the compressor 61 by way of a mechanical link 64. Alternatively, the energy transfer may be indirect, e.g. by electrical energy generation at the expander and transfer of the electrical energy to the motor 62.

By providing a pressure increase to the condenser 11 and not to the fuel cell stack 2, and by recovering a substantial part of the energy input to provide the increased pressure at the condenser, it may be operationally advantageous to switch to higher pressure operation of the condenser 11 sooner than may be the case than if energy recovery from the condenser exhaust is not provided, particularly taking into account the total parasitic load on the fuel cell system 60.

Figure 7:
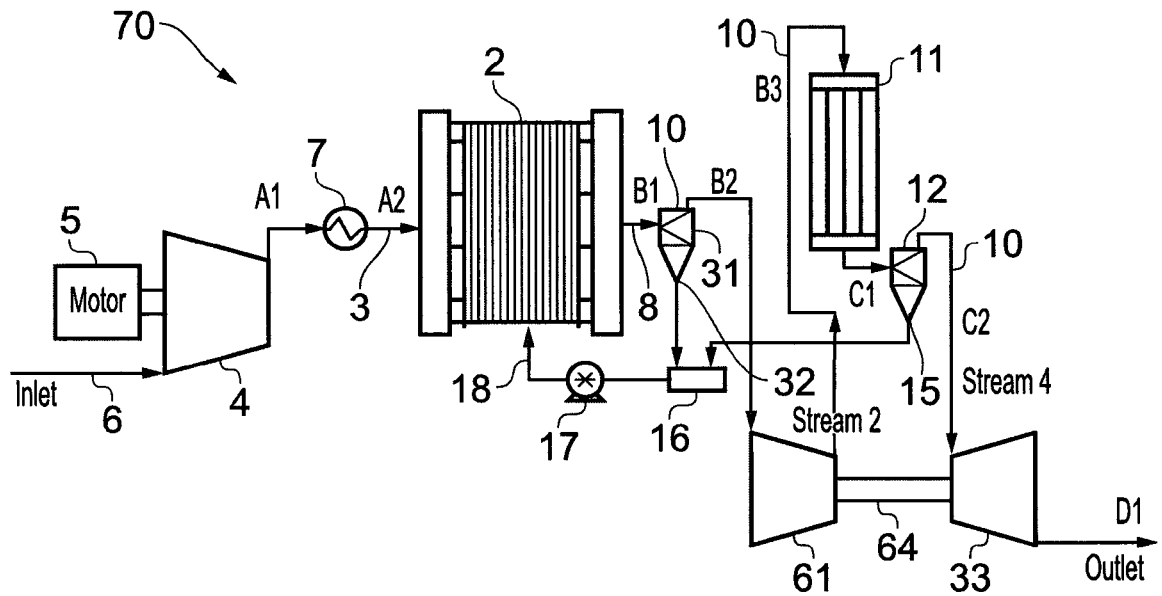
FIG. 7 shows a schematic diagram of a fuel cell system incorporating a fuel cell stack with inlet air flow compression, and a cathode exhaust condenser with compression and expansion stages.

FIG. 7 shows another example of a fuel cell system 70 which is a modification to that of FIG. 6. Where features in the system of FIG. 7 correspond to those in the systems of FIG. 6 or other earlier figures, the same reference numerals have been used and the discussion of those features is not repeated. An important difference between the fuel cell system 70 of FIG. 7 and the fuel cell system 60 of FIG. 6 is the addition of a compressor 4 at the fuel cell stack 2 cathode fluid inlet 3 powered by motor 5. This enables the stack 2 temperature and the condenser 11 temperature to be more easily and independently controlled. Like in the arrangement of FIG. 6, the arrangement of FIG. 7 provides for compressing and expanding the cathode exhaust gas around the condenser such that the temperature at the inlet 19a of the condenser 11 can be significantly higher than at the fuel cell stack 2 cathode exhaust 8. In this arrangement, the compressor 61 may be powered only by mechanical link 64 to the expander 33, thereby using only power extracted from the condenser exhaust stream. This may result in lower parasitic losses, while still enabling localised pressure increase in the condenser 11.

Figure 8:
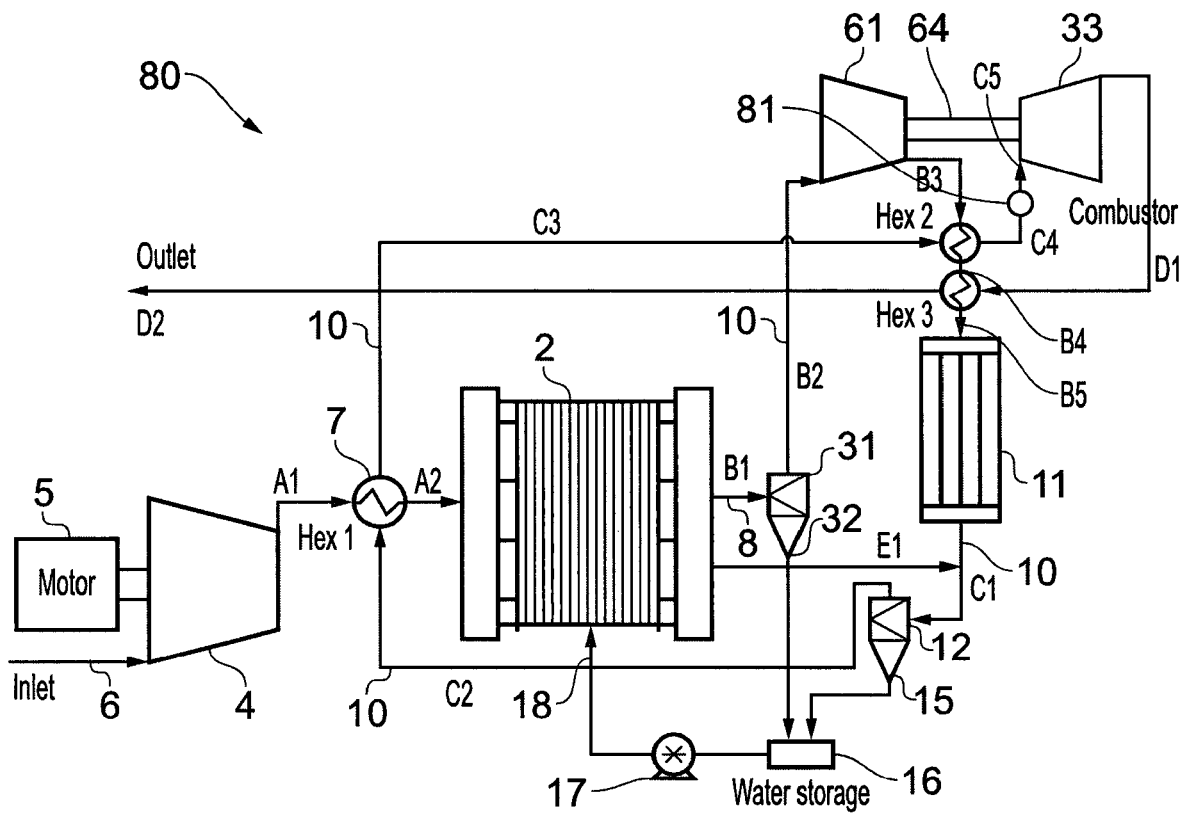
FIG. 8 shows a schematic diagram of a fuel cell system incorporating a fuel cell stack with motor-driven inlet air flow compression, and a cathode exhaust condenser with compression and expansion stages.

FIG. 8 shows a fuel cell system 80 with improved thermal integration. Where features in the system of FIG. 8 correspond to those in the systems of FIG. 7 or other earlier figures, the same reference numerals have been used and the discussion of those features is not repeated. In the system 80, the cathode exhaust stream in cathode exhaust conduit 10 is preheated at stream C5, by combusting anode off gas in a combustor 81, prior to entry into the expander 33. The stream B3 from the compressor 61 is fed to the condenser 11 and may also preheat stream C3 to C4 (which can be superheated). The outlet stream D2 may also be heated by stream B4, thereby rejecting more heat out of the exhaust. The outlet stream D2 can thus be super-heated, reducing the amount of steam emitted from the exhaust.

Like in the arrangements 60 and 70 in FIGS. 6 and 7, the temperature in the condenser 11 can be raised further by a motor-driven compressor-expander 61, 33 (instead of the non-motor-driven compressor-expander shown in FIG. 8) which increases the pressure in the condenser 11 while recovering some of the energy using the turbine expander 33.

By having the ability to increase the temperature of the heat rejection (e.g. in the condenser 11) it is possible to interface the fuel cell stack 2 to systems requiring high temperature heat recovery. One example is where heat is used to release hydrogen in secondary metal hydrides where operation at higher temperatures can lead to improved hydrogen energy storage density. An example of this is for complex metal hydrides such as alanates (AlH$_4$) that can release more hydrogen if they are heated above 110 degrees C. This is particularly important for automotive systems where reducing the size and mass of hydrogen fuel storage is important. Another example is in combined heat and power (CHP) systems where higher grade heat can be advantageous to improve the system design. Other possibilities include providing a heat source for adsorption heat pumps, ejector-driven heat pumps and energy recovery systems.

Thus, in a general aspect, the fuel cell system may further include a fuel generator. The fuel generator may be a metal hydride-based fuel generator for generating hydrogen for the fuel cell stack 2. The fuel generator may be a borohydride-based generator for generating hydrogen for the fuel cell stack 2. The fuel generator may be a reformer for the reforming of an alcohol, a hydrocarbon, ammonia or hydrazine, for generating hydrogen. A heat conduit (not shown) may be provided to thermally couple the condenser 11 with the fuel generator, so that the heat conduit is configured to transfer heat dissipated in the condenser to the fuel generator. The heat conduit may be provided by any suitable means such as a simple thermal contact between the condenser 11 and the fuel generator or a heat pump or heat pipe extending therebetween.

In another general aspect, the fuel cell system may be incorporated within a combined heat and power system, the system including a heat output element coupled to the condenser. In such an arrangement, the higher grade heat output from the condenser 11 is able to provide heat output at a higher temperature than in a conventional PEM fuel cell system.

Figure 9:
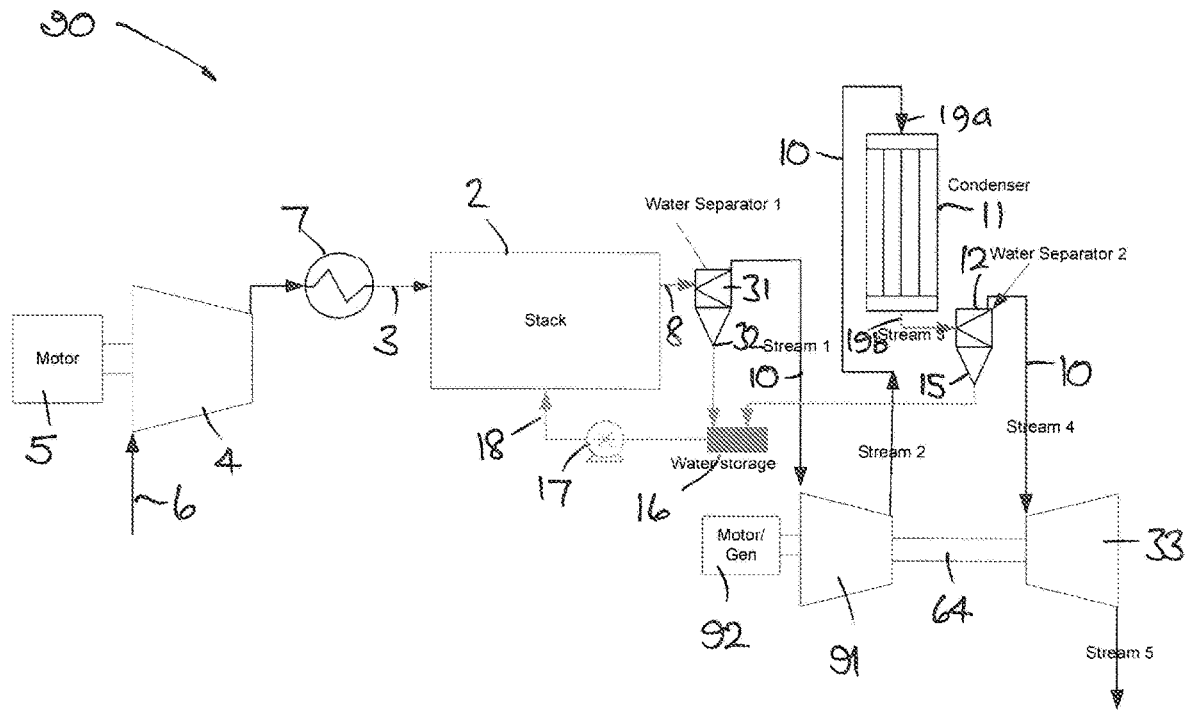
FIG. 9 shows a schematic diagram of a fuel cell system incorporating a fuel cell stack with motor-driven inlet air flow compression, and a cathode exhaust condenser with motor-driven compression and expansion stages.

FIG. 9 shows another example of a fuel cell system 90 which is a modification to that of FIG. 7. Where features in the system of FIG. 9 correspond to those in the systems of FIG. 7 or other earlier figures, the same reference numerals have been used and the discussion of those features is not repeated. System 90 in FIG. 9 corresponds with the system 70 in FIG. 7 but with the addition of a motor/generator 92 on the shaft 64 of the compressor 91/expander 33 around the condenser.

Figure 10:
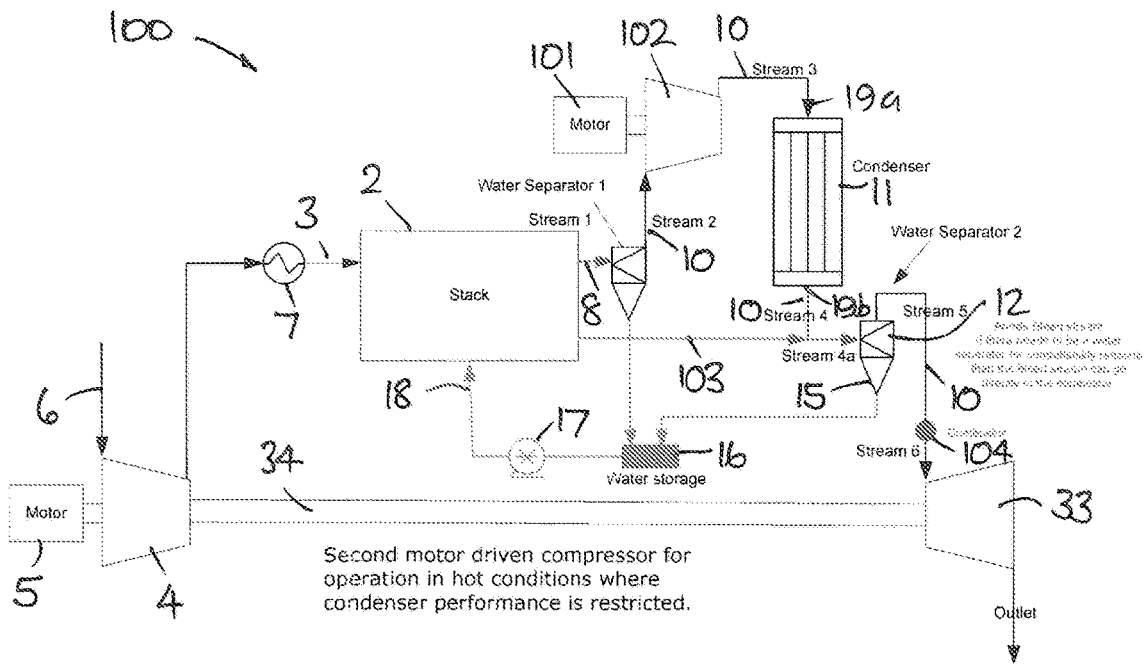
FIG. 10 shows a schematic diagram of a fuel cell system incorporating a fuel cell stack with motor-driven inlet air flow compression and outlet expansion stages, and a cathode exhaust condenser with motor-driven compression.

FIG. 10 shows another example of a fuel cell system 100 which is a modification to that of FIG. 7. Where features in the system of FIG. 10 correspond to those in the systems of FIG. 7 or other earlier figures, the same reference numerals have been used and the discussion of those features is not repeated. In the system 100, the compressor 102 for the condenser 11 is independently controllable by motor 101, and the energy from expander 33 is transferred to the cathode inlet compressor 4 via drive shaft 34. This provides more flexibility in the independent control of condenser temperature and pressure. The compressor 102 could be provided for operation in hot conditions where the condenser performance is restricted. The additions to the system 100 enable more flexibility in the way the system is controlled so that efficiency can be optimised and the necessary amount of heat is rejected.

Fuel cell system 100 also provides an optional anode bleed line 103 coupled to the input of water separator 12 to enable water to be recovered from any anode bleed flows. A combustor 104 may be provided between the gas outlet of the water separator 12 and the expander 33 such that any hydrogen in the anode bleed 103 can be combusted and at least some energy recovered by the expander 33.

Figure 11:
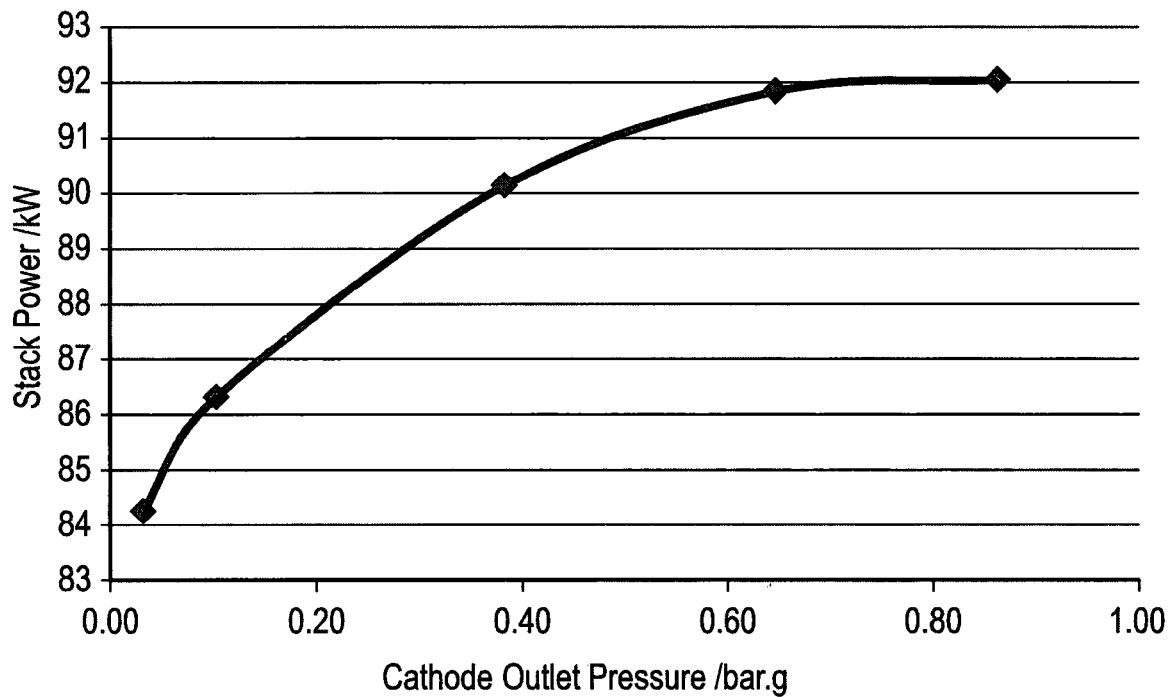
FIG. 11 is a graph showing stack power as a function of cathode outlet pressure.

FIG. 11 shows fuel cell stack power as a function of the cathode outlet pressure. As the stack cathode pressure is increased, the available stack power output also increases. Pressurising the stack 2 also raises its temperature. Beyond a certain point the increase in stack power starts to level out but the temperature will continue to increase with pressure. Limitations in a stack's maximum operating temperature are normally a function of the materials used, particularly the proton exchange membrane. The PEM's maximum operating temperature depends on its properties and the operating conditions but a typical limit lies between 90 degrees C. and 130 degrees C. with currently available technologies. Therefore, a practical limit is reached were the pressure in the stack should not be further increased because the rise in temperature would damage the PEM (and there may be no, or diminished, beneficial increases in power). At this point, the pressure of the condenser should be raised to improve the heat rejection thus condensing more water.

It would generally be favourable from an efficiency perspective to only raise the condenser pressure above the stack outlet pressure when appropriate water balance cannot be achieved. However, another consideration is the durability of the fuel cell stack 2 components. These are often highly sensitive to operational temperature so from a durability perspective it can be favourable to keep the stack temperature lower. Applying pressure to the condenser using the compressor positioned between the stack 2 and the condenser 11 enables the condenser temperature to be higher when there is water balance without increasing the stack temperature.

Some fuel cell types may not be very tolerant to differential pressure between the anode and cathode so one solution as described here is to keep the fuel cell stack 2 cathode pressure low, and increase the pressure in the condenser.

Figure 12:
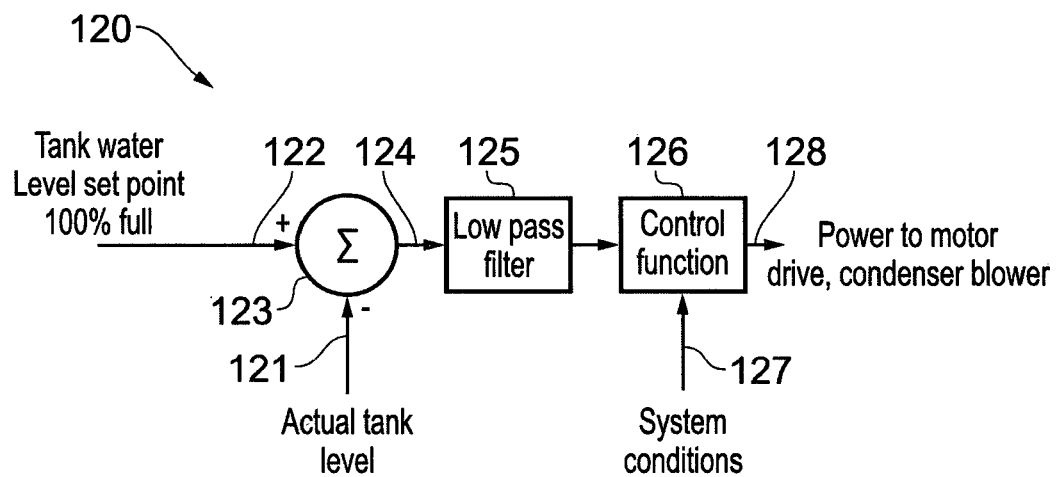
FIG. 12 is a schematic block diagram showing a control strategy for a fuel cell system.

FIG. 12 shows an example of a control strategy. For the systems 60, 90 where the compressor 61, 91 between the stack 2 and the condenser 11 is motor-driven (motors 62, 92), the power to the motor 62, 92 can be increased as the average level of the water tank is reduced. In FIG. 12, a control system 120 has a first input 121 corresponding to an actual sensed water level in the water storage vessel 16 and a second input 122 corresponding to a maximum fill level of the water storage vessel 16. The first and second inputs are fed to a comparator 123. The output 124 of the comparator 123 is fed to a low pass filter 125 which performs averaging. The time constant of the averaging may be in the range 1 to 1000 seconds. A control function 126 may receive as input 127 operating conditions of the fuel cell system 60, 90 such as one or more of ambient temperature, ambient pressure, stack power output, stack pressure, etc. The control function 126 provides output control signals 128 to control the power to the condenser compressor motors 62, 92. The control function 126 may be configured to balance out the requirements for durability of the system, heat rejection and system efficiency.

Similar control systems may be provided in respect of the other systems described in connection with FIGS. 1 to 10.

Thus, in a general aspect, the systems of FIGS. 6 to 10 may be provided with a controller configured to vary the power supplied to the compressor 61, 91, or 102 as a function of volume of water in a water recirculation circuit.

Other embodiments are intentionally within the scope of the accompanying claims.

The invention claimed is:

1. A fuel cell system comprising:
   a fuel cell stack having a cathode exhaust outlet coupled to a cathode exhaust conduit;
   a condenser in the cathode exhaust conduit for extracting water from a cathode exhaust stream in the cathode exhaust conduit;
   a first compressor disposed in the cathode exhaust conduit between the cathode exhaust outlet and the condenser;
   an expander disposed downstream of the condenser for recovering energy from the condenser exhaust stream;
   a first water separator disposed upstream of the condenser and between the cathode exhaust outlet and the first compressor; and
   a second water separator disposed between the condenser and the expander.

2. The fuel cell system of claim 1 in which the first compressor and the expander are coupled to pass energy recovered by the expander from the condenser exhaust to the first compressor.

3. The fuel cell system of claim 2 in which the first compressor and the expander are mechanically coupled to pass said recovered energy.

4. The fuel cell system of claim 3 further including a motor coupled to drive the first compressor and the expander.

5. The fuel cell system of claim 1 further including a water storage vessel disposed between an outlet of the condenser and a cathode inlet of the fuel cell stack.

6. The fuel cell system of claim 1 further including a second compressor coupled to a cathode inlet of the fuel cell stack.

7. The fuel cell system of claim 6 in which the second compressor and the expander are coupled to pass energy extracted by the expander from the condenser exhaust to the second compressor.

8. The fuel cell system of claim 6 further including a motor coupled to drive the first compressor.

9. The fuel cell system of claim 1 further including a controller configured to vary the power supplied to the first compressor as a function of volume of water in a water recirculation circuit.

* * * * *